United States Patent [19]
Reynolds

[11] Patent Number: 4,633,114
[45] Date of Patent: Dec. 30, 1986

[54] MOTOR COIL RETENTION APPARATUS

[75] Inventor: Kenneth R. Reynolds, Erie, Pa.

[73] Assignee: General Electric Company, Salem, Va.

[21] Appl. No.: 780,152

[22] Filed: Sep. 26, 1985

[51] Int. Cl.$^4$ ............................................. H02K 1/18
[52] U.S. Cl. ..................................... 310/194; 310/42; 310/91
[58] Field of Search ................. 310/42, 49 R, 91, 186, 310/194, 208, 214, 215, 216, 218, 254, 258, 259, 269

[56] References Cited

U.S. PATENT DOCUMENTS

| | | | |
|---|---|---|---|
| 1,119,988 | 12/1914 | Rapp | 310/194 |
| 1,300,859 | 4/1919 | Nikonow | 310/194 |
| 2,709,763 | 5/1955 | Opel | 310/194 |
| 4,210,890 | 7/1980 | Olsen | 310/42 |

Primary Examiner—Patrick R. Salce
Assistant Examiner—D. L. Rebsch
Attorney, Agent, or Firm—Arnold E. Renner

[57] ABSTRACT

Apparatus for retaining a coil in position with respect to a pole and electric motor, the pole forming a substantially rectangular shaped projection internally of the motor, having a width approximately the same dimension as the width of a central aperture of the coil through which the pole is to project, comprising a generally L-shaped member having one arm adapted for sliding into a space between a pole and the coil and a second arm bent to overlay a surface of the coil for pressing the coil against a frame of the motor. The pole is provided with a retention structure running longitudinally along each side such that the arm of the L-shaped member lying in the space between the pole and coil can grasp the retention structure so as to be retained in a fixed position. The L-shaped member is constructed of an elastic material which is deformed by insertion into the space between the pole and coil such that the spring action of the second arm of the L-shaped member is exerted against a surface of the coil to press it downward onto the pole. The ends of the L-shaped member are reverse curved in order to prevent the ends from damaging the insulation on the coil, and the edges and corners are rounded to minimize the opportunity for point discharge of high voltage.

12 Claims, 4 Drawing Figures

MOTOR COIL RETENTION APPARATUS

BACKGROUND OF THE INVENTION

The present invention relates to electric motors and more particularly to a mounting arrangement and coil retaining clip for a coil in an electric motor.

A standard electric motor is constructed of an annular stator surrounding a rotating armature or rotor whereby a plurality of windings on the rotor sequentially cut through lines of flux generated by magnetic poles established about the inner surface of the stator (field poles). In a direct current electric motor, the windings of the rotor are connected to a plurality of commutator bars and are supplied with power by brushes which rub against the bars to make an electrical contact. The currents through the armature windings on the rotor create magnetic poles on the rotor which interact with the flux generated by the magnetic poles of the stator to create torque on the rotor and cause rotation. The brushes force armature current reversal in each armature winding as the associated commutator bar passes under a brush. In order to prevent arcing at the brushes as the brushes pass from one commutator bar to another, motor designers typically provide commutating poles about the motor stator which cause a voltage to be generated to assist in reversing the current so that arcing at the commutator/brush interface is minimized.

Although the utilization of commutating poles within the motor solves the brush arcing problem, such poles create a construction problem in that the spacing between field poles and the windings on the field poles does not leave much room for insertion of additional windings about a commutating pole. In a typical motor construction process, an outer housing or stator shell is constructed of a magnetic material to provide a magnetic path for flux about the motor. Separate field and commutating poles are manufactured which can be bolted to the inside surface of the stator shell. The windings are wound outside of the motor and wrapped with appropriate insulation prior to installation. In the installation process, the pole faces are inserted through apertures in the center of the pre-formed windings and then bolted into position inside the stator. However, such a construction is not practical for smaller, lower horsepower motors. Preferably, in a lower horsepower motor, the field poles would be formed as an integral part of the stator shell and the windings thereafter either wound upon or placed upon the field poles. As long as there is sufficient space within the motor and between the field poles and adjacent windings, it is practical to wind the field poles in situ. Because the construction of most efficient types of main field poles requires that the surface of the pole adjacent the armature be as wide as possible, the typical construction requires a pole which is constructed with a shape in which the base of the pole adjacent the stator shell is narrower than the face of the pole adjacent the armature. Accordingly, for main field poles which are constructed as an integral part of the stator shell, it is not possible to pre-form the windings and place them over the poles. In such construction, it is usual to wind the field poles in situ. However, once the main field poles have been wound the space available within the stator shell for winding and commutating poles is such that economical winding of the commutating poles in situ is impractical. Fortunately, because the commutating poles are not required to have the same enlarged face configuration as main field poles, it is possible to pre-form windings which can be placed upon commutating poles that are made as an integral part of the stator shell.

Accordingly, it is an object of the present invention to provide a mounting arrangement for pre-formed windings in position around a pole in an electric motor.

It is a still further object of the present invention to provide an apparatus for holding pre-formed windings of an electric motor in place about a magnetic pole structure.

In accordance with the present invention, there is provided a mounting arrangement and apparatus for an electric motor which efficiently retains coils in place over a pole. In a preferred embodiment, the apparatus comprises a generally L-shaped member formed of stainless steel in which a first arm of the L-shaped member can be slipped between a pole and an inner surface or face of a winding placed around the pole. A second arm of the L-shaped member extends outwardly from the pole overlapping a portion of the winding. The first arm includes lance outs which slip into indentations in the sides of the pole and which are held in place by the pressure of the winding against the pole. The indentations prevent the L-shaped member from slipping out of the space between the winding and pole. Preferably the second arm of the L-shaped member forms an acute angle with the first arm to thereby provide a spring-like pressure against a surface of the winding to press the winding firmly against an inner surface of a stator shell. In addition, each of the distal ends of the L-shaped member include a reverse bend projecting away from an adjacent winding surface so as to prevent damaging of insulation on the winding. Each corner of the member is rounded with a large radius to eliminate high potential arc discharge points. In the mounting arrangement of a winding, a plurality of the L-shaped members may be utilized about a pole face in order to firmly secure a winding in position. The present invention thus provides a simple and economic means of securing a winding, such as a commutating winding, within an electric motor.

DESCRIPTION OF THE DRAWINGS

For a better understanding of the present invention, reference may be had to the following detailed description taken in conjunction with the accompanying drawings in which.

DETAILED DESCRIPTION

Figure 1:
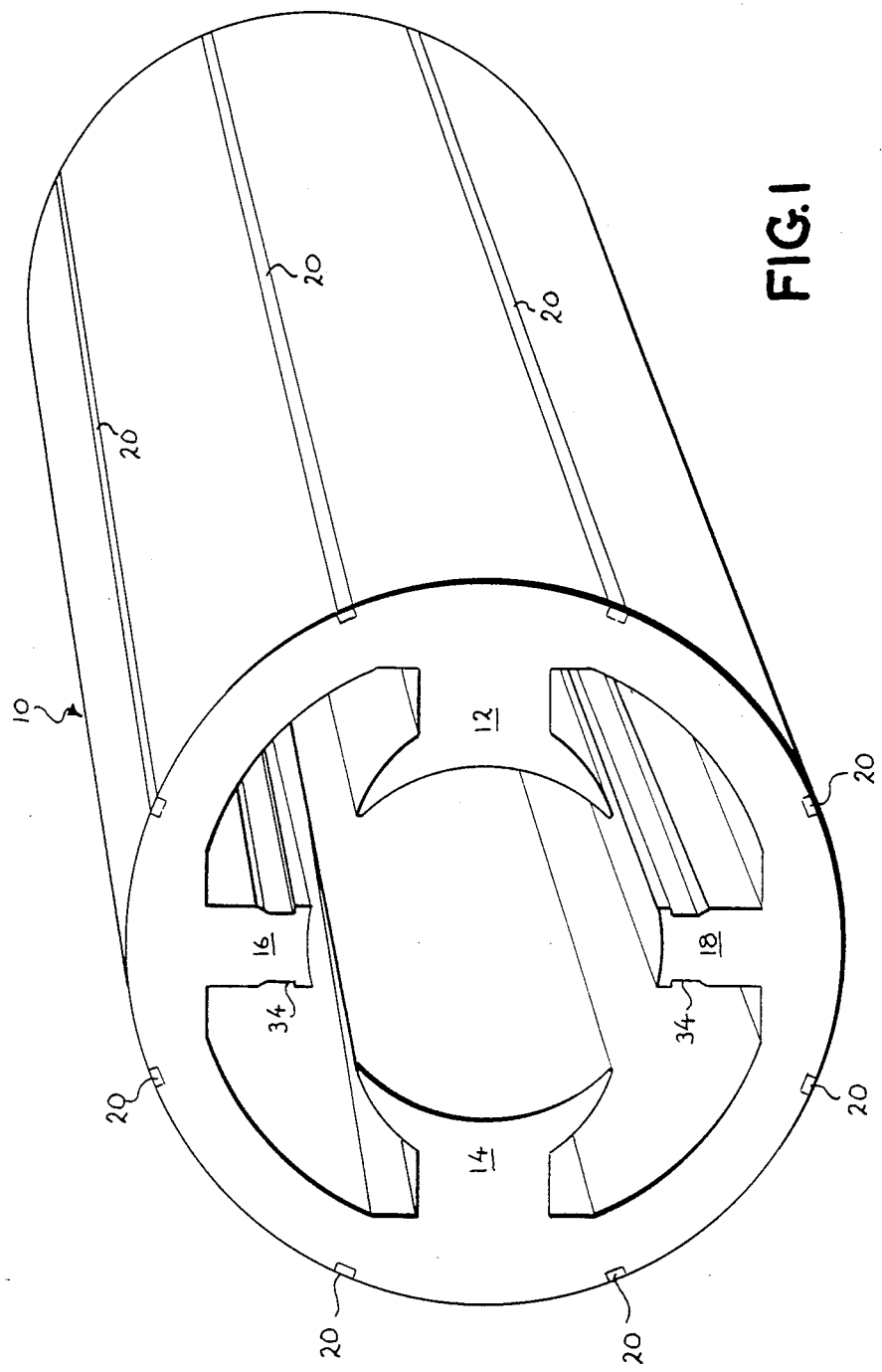
FIG. 1 is a perspective end view of a motor stator showing construction of an integral main field pole and commutating pole arrangement.

Referring now to FIG. 1, there is shown a perspective view of a motor stator shell 10 having integral pre-formed main field poles 12 and 14 and commutating poles 16 and 18. In one embodiment, the motor stator is constructed by stamping a plurality of sheet metal forms having the shape of the end view of the motor stator shell 10. The individual metal forms are then stacked to form the elongated stator shell 10. The punched and stacked metal sheets may be held together by tensioned metal strips 20. The stator shell 10 comprises a shell or housing for mounting of the electrical windings which, when energized with electric current, generate the flux necessary to operate the motor. A further metal housing (not shown) is normally provided for the stator shell 10 to slip into, and forms the outer casing of the motor per se.

As can be seen, the shape of the main field poles 12 and 14 is such that pre-formed windings or field coils cannot be conveniently slipped over the wide outer faces of the poles 12 and 14. Accordingly, the field coils for this type of integral field pole construction must be wound in situ. However, as will be appreciated by those familiar with the motor art, once the field coils have been wound around the main field pole, the wire size and remaining space make in situ winding of the commutating windings or coils around the commutating poles 16 and 18 impractical. Accordingly, the commutating coils are preferably pre-formed and thereafter slipped over the commutating poles, thus requiring some means of firmly attaching and retaining the commutating coils to the commutating poles.

Figure 4:
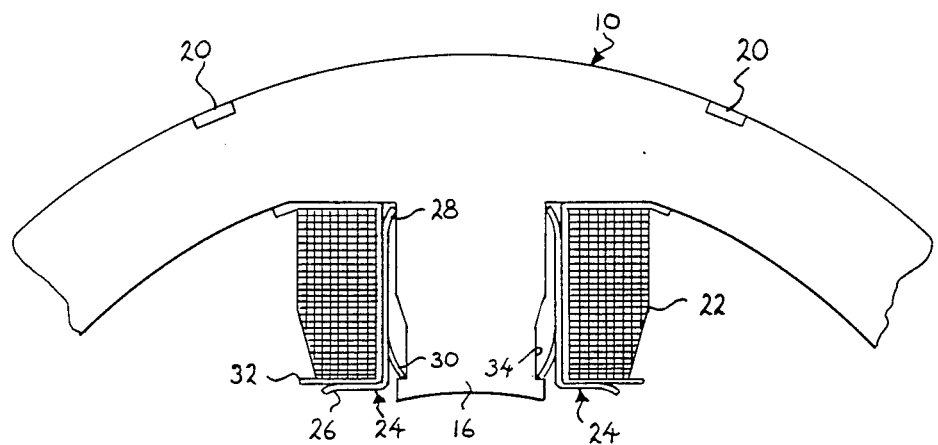
FIG. 4 is a partial end view of the motor of FIG. 1 showing the inventive mounting arrangement utilizing the L-shaped member of FIG. 2 for holding a winding in position.

Referring briefly to FIG. 4, there is shown a mounting arrangement in accordance with the present invention for supporting a winding, e.g., a commutating coil 22, about a pole, e.g., a commutating pole 16. For purpose of discussion, the numeral 22 will refer to each commutating coil in the stator shell 10. FIG. 4 is a partial cross-section of the stator shell 10 of FIG. 1 illustrating a pre-formed coil 22 which is held in place by means of L-shaped members or retaining clips 24.

Figure 2:
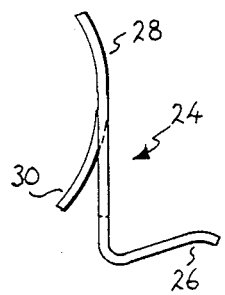
FIG. 2 is an end view of an L-shaped member in accordance with the present invention.
Figure 3:
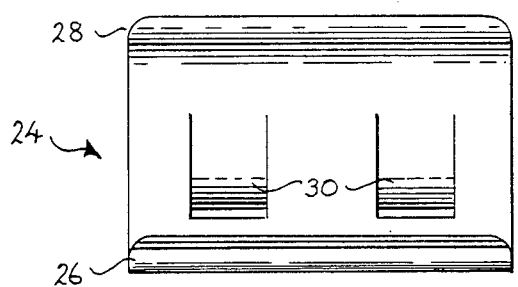
FIG. 3 is a front view of the member of FIG. 2.

Turning now to FIG. 2, there is shown an edge view of the clip 24. As can be seen, the clip 24 comprises a generally L-shaped member having a shorter arm 26 which is formed at an acute angle with a longer arm 28. A lance-out 30 is provided by die punching the longer arm 28 so as to cut a piece along three sides which can be bent outwardly from the arm 28 to project generally toward the elbow of the clip member. As shown in FIG. 3, in a preferred embodiment, there are two lance-outs 30 provided in each of the clips 24 to provide for additional stability. Again referring to FIG. 2, it can be seen that each of the arms 26 and 28 terminates in a slight reverse bend which, in the discussion to follow with respect to FIG. 4, will be seen to protect the coil 22 from any sharp edges of the clip 24. Furthermore, large radii of the ends of the arms 26 and 28 (as shown in FIG. 3) are provided at the corners to prevent damage to any winding or insulation and to eliminate discharge points from which electricity might be drawn to ground.

Referring again to FIG. 4, it can be seen that the arm 28 of the clip 24 slides into a space between the sides of the commutating pole 16 and an inner surface of the commutating coil 22. When placed in a proper position, each lance-out 30 of each clip 24 is caught by an appropriate retention structure shown in FIG. 4 as an indentation or notch 34 formed in the side of the commutating pole 16. (Although not shown and not as efficient from a space standpoint, the retention structure on the pole could also comprise a protrusion extending outwardly from the side of the pole.) The size of the coil 22 with respect to the pole 16 maintains each clip 24 in engagement with the side of the pole 16 such that the clips are retained in place. The arm 26 of the retaining clip 24 presses on the top of the coil 22 forcing the coil against an inner surface of the stator shell 10. Thus, it can be seen that the coil 22 holds the retainer clip 24 in place while the retainer clip 24 in turn holds the coil 22 in place. If desired, a thin sheet of insulation material 32 may be placed between the coil 22 and the stator shell 10 at any point at which coil 22 might make contact with a metal surface.

Preferably, the retainer clip 24 is constructed of a material which has minimal effect on the electromagnetic field within the motor and also has reasonable spring-like elastic characteristics. One material meeting these requirements is stainless steel. Other possible materials include spring brass, aluminum, etc. A magnetic material could be used but such would tend to distort the magnetic field. In a preferred embodiment, the clip 24 is constructed of 0.032 inch thick stainless steel.

In practicing the invention, each commutating coil 22 is pre-formed to an appropriate size winding having the desired electrical characteristics. The sheet insulating material 32, preferably NOMEX ®, is placed about the surface of the stator shell 10 to protect the coils. The field coils (not shown) are then wound in situ about the field poles 12 and 14. Thereafter, the pre-formed commutating coils, such as coil 22, are placed over the commutating poles 16 and 18. The clips 24 are slipped into the aperture between the sides of the commutating poles 16 and 18 and the inner surface of the corresponding commutating coil until the spring action of each lance-out 30 causes it to latch on the retention structure such as the slot 34 along each side of each commutating pole. The acute angle formed between the arm 26 and the arm 28 allows the arm 26 to flex and apply spring pressure on each commutating coil to hold it in place. Preferably, the amount of deflection is such that minor variations in coil dimension may be accommodated and still attain adequate retention pressure on the coil 22. The slight reverse bends at the ends of the arms 26 and 28 prevent sharp corners of the spring clip from damaging the coil insulation.

Although the use of the clip 24 as shown in FIG. 4 shows only a single clip on each side of the commutating pole 16, it will be appreciated that the number of clips used may be varied as required in order to hold the coil 22 in place. The number of clips will typically be determined by the length of the stator shell 10. For example, an 18-inch motor may require as many as six clips for each commutating coil. It will thus be appreciated that what has been described above is a mounting arrangement for a motor winding which allows maximum utilization of the space available within a direct current electric motor for sizing of the winding.

Although the coil mounting arrangement and retaining clip have been shown in a preferred embodiment, it will be appreciated that modifications and variations of the arrangement and clip are possible without departing from the spirit and scope of the invention. For example, the arrangement should not be construed as limited to mounting of a commutating winding since other windings may be pre-formed and retained in position using the invention. It is intended therefore that the invention not be limited to the illustrative embodiment but that it be given the full scope commensurate with the appended claims.

I claim:

1. Apparatus for retaining a coil in position with respect to a pole of an electric motor, the pole forming a substantially rectangular shaped projection internally of the motor and having a width approximately the same dimension as the width of a central aperture of the coil through which the pole is to project, and further having a retention structure running longitudinally thereof along each side, said apparatus comprising a generally L-shaped member having at least one lance-out projecting outwardly and toward an elbow of the L-shaped member from a first arm thereof, said lance-out being adapted to contact the retention structure of the pole, a second arm of the L-shaped member extending away from the pole in a position to overlap the coil, whereby said member is held in place by contact with said retention structure of the pole and the coil is retained by said second arm of said member.

2. The apparatus of claim 1 wherein said L-shaped member is constructed of an elastic material and said second arm is formed at an acute angle to said first arm whereby spring pressure may be applied to the coil.

3. The apparatus of claim 1 wherein the extreme ends of each of said first and second arms have a reverse bend to thereby prevent contact with the coil by said ends.

4. The apparatus of claim 1 wherein each corner of said clip is rounded to a large radius to minimize points for high-potential discharge.

5. A mounting arrangement for a commutating coil on a commutating pole in a direct current electric motor, the coil being pre-formed to a desired shape, a predetermined number of coil turns, and having a central aperture for sliding onto the pole, the mounting arrangement comprising a retention structure associated with each side of the pole and a plurality of unitary L-shaped clip members of spring-like elastic material each having a first arm sized to slip between a side of the pole and an inner surface of the coil, a second arm of each pole of the clip members extending outwardly from the pole and overlapping a surface of the coil whereby the coil is pressed downward onto the pole, and means on each of the first arms contacting the retention structure on the pole whereby the clips are retained on the pole.

6. The mounting arrangement of claim 5 wherein said retention structure comprises a groove.

7. The mounting arrangement of claim 5 wherein said means contacting said retention structure comprises lance-outs exhibiting spring characteristics.

8. The mounting arrangement of claim 5 wherein said second arm is formed at an acute angle with respect to said first arm.

9. The mounting arrangement of claim 5 wherein said clip members are made of non-magnetic material.

10. The mounting arrangement of claim 9 wherein said clip members are made of stainless steel.

11. The mounting arrangement of claim 5 wherein each corner of each clip member is rounded.

12. The mounting arrangement of claim 5 wherein each of said first and second arms have a reverse bend at the end thereof.

* * * * *